United States Patent
Nobuta et al.

(10) Patent No.: US 6,800,395 B2
(45) Date of Patent: Oct. 5, 2004

(54) SECONDARY BATTERY OF PROTON CONDUCTIVE POLYMER

(75) Inventors: Tomoki Nobuta, Tokyo (JP); Toshihiko Nishiyama, Tokyo (JP); Hiroyuki Kamisuki, Tokyo (JP); Gaku Harada, Tokyo (JP); Masato Kurosaki, Tokyo (JP); Yuuji Nakagawa, Tokyo (JP); Shinya Yoshida, Tokyo (JP); Masaya Mitani, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 239 days.

(21) Appl. No.: 09/986,791

(22) Filed: Nov. 13, 2001

(65) Prior Publication Data

US 2002/0086203 A1 Jul. 4, 2002

(30) Foreign Application Priority Data

Nov. 13, 2000 (JP) ....................................... 2000-345256

(51) Int. Cl.[7] ............................................... H01M 4/60
(52) U.S. Cl. ...................... 429/204; 429/345; 429/205; 429/212; 429/213
(58) Field of Search ................................ 429/818, 345, 429/204, 205, 212, 213, 215, 216, 217, 214

(56) References Cited

U.S. PATENT DOCUMENTS

| | | | | |
|---|---|---|---|---|
| 3,769,089 | A | * 10/1973 | Oomen et al. | 429/199 |
| 4,830,785 | A | * 5/1989 | Shinozaki et al. | 252/62.2 |
| 6,300,015 | B1 | * 10/2001 | Nishiyama et al. | 429/303 |
| 2001/0028977 | A1 | * 10/2001 | Kazacos et al. | 429/105 |

FOREIGN PATENT DOCUMENTS

JP    8-162147    6/1996

* cited by examiner

*Primary Examiner*—Bruce F. Bell
*Assistant Examiner*—Monique Wills
(74) *Attorney, Agent, or Firm*—Young & Thompson

(57) ABSTRACT

A secondary battery of a proton conductive polymer, wherein a positive electrode and a negative electrode are arranged facing to each other via a separator in an electrolyte and only a proton or a proton of a hydroxyl group in an indole trimer and a π conjugated polymer, i.e., an active material of electrode in the positive electrode and in the negative electrode participates in a charge/discharge, and a proton concentration is 5 to 40% and an anion concentration is 30 to 60% in the solution, respectively, and the anion concentration is at least higher than the proton concentration.

7 Claims, 3 Drawing Sheets

SECONDARY BATTERY OF PROTON CONDUCTIVE POLYMER

BACKGROUND OF THE INVENTION

1. Field of the Invention

This invention relates to a secondary battery of a proton conductive polymer, particularly the secondary battery wherein capacity characteristic and cycle characteristics are improved.

2. Description of the Related Art

A secondary battery of a proton conductive polymer consists of a construction, wherein a positive electrode is formed on a positive electrode collector and a negative electrode is formed on a negative electrode collector and these electrodes are piled up via a separator, and aqueous or non-aqueous solution containing a proton source as an electrolyte is filled therein.

A method of forming an electrode consists of preparing a slurry by adding an adhesive to the powder of a raw material polymer which is doped or not doped and a conductive adjuvant on a collector such as a conductive rubber sheet, injecting the slurry into a desired mold and forming an electrode having a desired electrode density and membrane thickness by a hot-press.

A battery is constructed by arranging the positive electrode and the negative electrode, thus formed, facing to each other via a separator.

An aqueous solution of sulfuric acid is particularly utilized as an electrolyte wherein the sulfuric acid supplies a proton to the system by dissociating in two steps.

$$H_2SO_4 \rightarrow H^+ + HSO_4^- \quad (1)$$

$$HSO_4^- \rightarrow H^+ + SO_4^{2-} \quad (2)$$

The dissociation constant ($pK_2$) of the second step (Formula (2)) is 1.9 which is comparatively small and the dominant anion in the aqueous solution is $HSO_4^-$ of the first step (Formula (1))

FIG. 4 illustrates a graph showing a comparison of terminal voltages vs. capacities in the electrolyte between 40 wt % and 20 wt % sulfuric acid (Comparative Example 2 and 3 described later). The graph indicates that increasing the concentration of sulfuric acid improves the initial capacity; however, the cycle characteristics in the case of 40 wt % sulfuric acid are remarkably reduced as shown in FIG. 5.

In the secondary battery of a proton conductive polymer, $HSO_4^-$ is doped as a dopant in the polymer and a secondary battery having a high capacity can be formed by increasing the electric conductivity of the electrode material by raising the sulfuric acid concentration. However, since simply increasing the sulfuric acid concentration of the electrolyte reduces the cycle characteristics as described above, the sulfuric acid concentration of the battery of a proton conductive polymer is set up at about 20%.

The initial doping rate into the electrode at this sulfuric acid concentration (dopant concentration) was not sufficiently obtained and the capacity was not satisfactory enough because the concentration of the electrolyte was changed by an electrochemical doping accompanied by charge/discharge. Furthermore, the cycle characteristic was hardly sufficient and the low temperature characteristic was also insufficient.

SUMMARY OF THE INVENTION

The purpose of this invention is to provide a secondary battery of a proton conductive polymer having both an excellent capacity and excellent cycle characteristics.

As a result of studies to solve the problems as described above, the inventors found that the cause of the deterioration of the cycle characteristics when increasing the concentration of sulfuric acid for the purpose of a sufficient doping was due to promoting the deterioration of the electrode material by the state of peroxidation which was simultaneously brought about by the high proton concentration in the system. Therefore, in order to increase the dopant anion concentration and restrict an increase in proton concentration of the system simultaneously, a material was added which is not a source of a proton but can supply an anion equivalent to the anion species present in the system. In this way it became possible to increase only the dopant (anion species) concentration without changing the concentration of proton, raise the capacity and improve the cycle characteristics.

This invention relates to a secondary battery of a proton conductive polymer, wherein a positive electrode and a negative electrode are arranged facing to each other via a separator in an electrolyte and only a proton in an indole trimer and a π conjugated polymer or a proton of a hydroxyl group in a hydroxyl-containing polymer as an active material of electrode in the positive electrode and in the negative electrode participates in a charge/discharge, and a proton concentration is 5 to 40% and an anion concentration is 30 to 60% in the solution, respectively, and the anion concentration is at least higher than the proton concentration.

Particularly when the electrolyte is an aqueous solution of sulfuric acid, an addition of a hydrogensulfate is preferable.

According to this invention, in the battery of a proton conductive polymer, the activity of the active material of the electrode can be increased sufficiently by increasing only the concentration of the dopant anion without increasing the proton concentration in the system and it is possible to restrict the volume change of the electrode and the structural deterioration, and provide a battery having a longer life than conventional one by having the same dopant species of the additive as the chemical species of the electrolyte. In addition, the low temperature characteristic is improved by the effect of molar depression of freezing point since the concentration of chemical species in the system is raised without increasing sulfuric acid concentration by adding the additive.

DETAILED DESCRIPTION OF THE PREFERRED EMBODIMENTS

Figure 1:
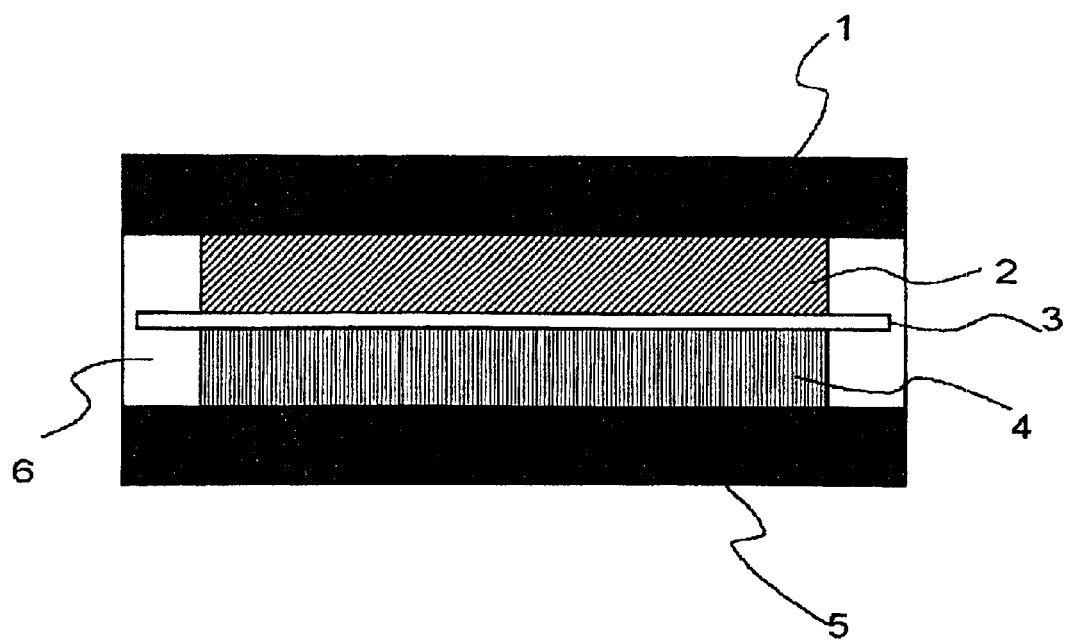
FIG. 1 is a rough cross section of a working form of a battery of this invention.

There is a lead battery wherein an aqueous solution of sulfuric acid is used as an electrolyte which is similar to the secondary of this invention. For example, Japanese Patent Application No.162147/96 discloses an addition of hydrogensulfate to the electrolyte as an additive. It describes that the addition of hydrogensulfate serves an increase in the capacity and the life elongation, which is similar to this invention.

In a lead battery, a charge/discharge reaction according to the reaction formula (3) described below occurs and electrolysis of water (reaction formula (4) and (5)) also occurs as a side reaction resulting in a decrease in water content. If the battery is left as a state of over-discharge, the concentration of sulfuric acid reduces by the self-discharge which causes to lower the density of the solution and increase the solubility of $PbSO_4$ resulting in dissolving out a large amount of $Pb^{2+}$ which combines with $OH^-$ and $O^{2-}$ to form a crystal of $PbO_x$. Furthermore, since the pH of the electrolyte increases and the electric potential reduces by the oxidation, a non-reducing $PbSO_4$ is crystallized out in the neighborhood of a positive electrode grid by the reduction.

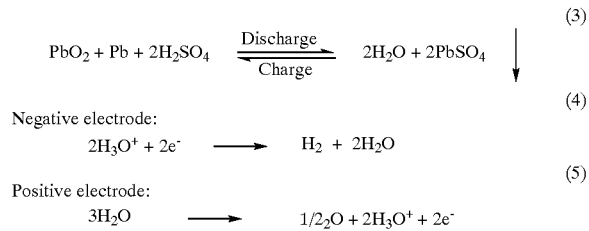

Negative electrode:
$$2H_3O^+ + 2e^- \longrightarrow H_2 + 2H_2O \quad (4)$$

Positive electrode:
$$3H_2O \longrightarrow 1/2 O_2 + 2H_3O^+ + 2e^- \quad (5)$$

Therefore, in order to avoid the crystallization, sulfate is added as an additive in the lead battery and furthermore, the patent application suggests that hydrogensulfate is more effective than sulfates which are used conventionally.

However, in the battery of a proton conductive polymer of this invention only a proton participates in the charge/discharge and the reaction mechanism in this battery is quite different from that of the lead battery which is accompanied by the crystallization and the electrolysis of water.

In this invention, a conductive polymer exhibits an electric conductivity by doping. Therefore, the effect of the doping reaction on the activity of the conductive polymer depends on the concentration of the electrolyte. As described above, if the concentration is too high, the structure of the electrode deteriorates by the state of peroxidation, and on the other hand, if the concentration is too low, the activity is insufficient, the battery capacity cannot be increased, and the charge/discharge becomes worse.

Therefore, in this invention, in order to realize the activation of the conductive polymer, a chemical substance is added which can supply a dopant but not a proton in an electrolyte consisting of an aqueous solution of sulfuric acid without increasing the proton concentration in the doping reaction of the conductive polymer of a counter electrode. In this way, a chemical and electrochemical activation effect of an active material of the counter electrode is realized by intervening a dopant in sufficient amount for the doping reaction. According to this method, the deterioration of the electrode structure due to the high proton concentration is restricted and the electrode activity is raised by the improvement of the doping efficiency resulting in a high capacity of the battery.

In order to restrict the deterioration of the electrode structure, the proton concentration of 5 to 40% is preferable and 5 to 20% is more preferable. On the other hand, it is important to keep the dopant anion concentration at a level higher than that of proton in order to give a sufficient activity. However, too high concentration may not be practical because the viscosity of the electrolyte becomes high and crystallization will occur at low temperature and therefore a range of 30 to 60% is preferable and 30 to 50% is more preferable.

Furthermore, in this invention, as an additive chemical substance, hydrogensulfate was selected which can supply hydrogensulfate ion ($HSO_4^-$) indicating the same chemical species as a dopant anion in the aqueous solution of sulfuric acid, i.e., the electrolyte. The hydrogensulfate is expressed as $X-HSO_4$ [where X is $N^+R_4$ (R=H or an alkyl group), K, and Na] and the hydrogensulfate ion having an excellent solubility in water may be used. According to the inventors' study there were few effects due to the difference of cation species.

It is possible to restrict a volume change of an active material of a counter electrode and the deterioration of the structure by having the dopant anion of the same chemical species, and in this way it is possible to improve the life of the battery longer than the existing one.

In addition, since hydrogensulfate has a large solubility in water (about 50%/25° C. $H_2O$) and is a chemical substance having a high cation transference number because of its large acidity, even its small addition at a temperature of using condition of the battery of a proton conductive polymer helps to reduce the inner resistance of the battery at low temperature and can increase the discharge capacity larger than the conventional one.

The concentration of sulfuric acid in the electrolyte is preferably 5 to 40 wt %, more preferably 5 to 20 wt % and the weight ratio of the hydrogensulfate to be added to 100 parts of sulfuric acid is preferably 5 to 45 parts, more preferably 5 to 30 parts. If the concentration of sulfuric acid is low, the addition of the hydrogensulfate is preferably set in somewhat larger amount.

A structure of a secondary battery of this invention will be explained referring to a drawing. FIG. 1 is a conceptual drawing of a secondary battery of a proton conductive polymer relating to the invention. A positive electrode 2 is provided on a positive electrode collector 1 and a negative electrode 4 is provided on a negative electrode collector 5 and these electrodes are piled up facing to each other via a separator 3 to construct a battery. In this example the separator 3 separates the positive electrode and the negative electrode completely by being supported by a gasket 6; however, the separator may be provided only in an area of separating both electrodes so that the electrolyte may not be separated.

Each electrode contains an active material of a polymer electrode and a conductive adjuvant such as carbon black, all of which are dispersed in a binder matrix or molded by hot-pressing. Polymers used as an active material are, for example, π conjugated polymers such as polyaniline, polythiophene, polypyrrole, polyacetylene, poly-p-phenylene, polyphenylenevinylene, polyperinaphthalene, polyfuran, polyfurane, polythienylene, polypyridinediyl, polyisothianaphthene, polyquinoxaline, polypyridine, polypyrimidine, indole trimer, polyaminoanthraquinone and the derivatives of these polymers, and a polymer containing a hydroxyl group (hydroxyl group formed by conjugation of oxygen in quinone) such as polyanthraquinone and polybenzoquinone. When a redox pair is formed by doping these polymers, an electric conductivity appears. In order to apply these polymers to the positive electrode and the negative electrode, a combination of polymers selected based on a redox potential difference is adopted. The active material of the positive electrode is preferably selected from a group consisting of polyaniline, polydianiline, polydiaminoanthraquinone, polybiphenylaniline, polynaphthylaniline, indole trimer and their derivatives; the active material of the negative electrode is preferably selected from a group consisting of polypyridine, polypyrimidine, polyquinoxaline and their derivatives. A combination of the indole trimer described below or its derivatives as the active material of the positive electrode and polyquinoxaline described below as the active material of the negative electrode is particularly preferable.

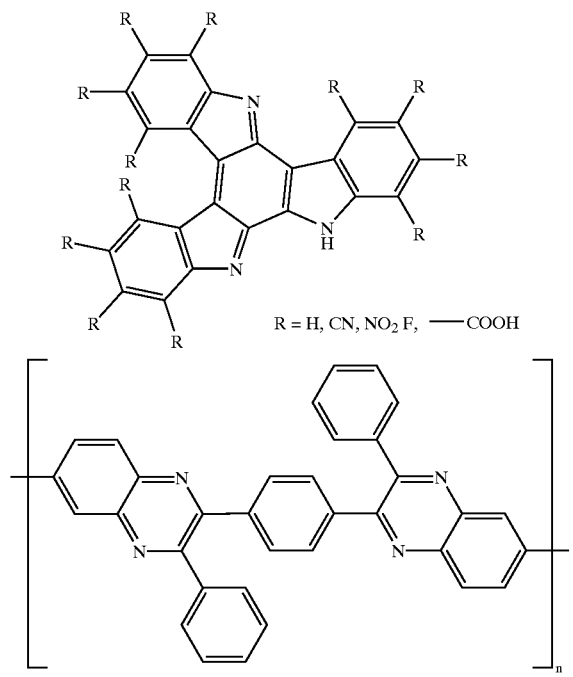

R = H, CN, NO₂ F, —COOH

So far, the secondary battery of a polymer constructed via only a separator has been explained. However, this invention is not to be construed as being limited to the battery mentioned above and can also be applied to a construction having a solid electrolyte, a gel solid electrolyte and a molten salt electrolyte.

Furthermore, this invention is not construed as being limited to the secondary battery containing the electrolyte of the aqueous solution of sulfuric acid and can also be applied to a system of other electrolytes of protonic acid such as system of hydrochloric acid or phosphoric acid if they can increase only dopant species without increasing a proton concentration.

This invention will be explained concretely referring to the following examples and is not to be construed as being limited only to these examples.

Polyfluorovinylidene (mean molecular weight: 1100) resin as a binder was added by 8 wt % to a mixture of a trimer (5-cyanoindole) as an active material of a positive electrode and carbon grown in the vapor phase as a conductive adjuvant in a weight ratio of 3:1 and the mixture was completely stirred by a homogenizer. The mixture was injected into a mold of desired size to form a positive electrode having a desired electrode-density and thickness by a hot-press.

A mixture of polyphenylquinoxaline as an active material of a negative electrode and KB600, carbon grown in the vapor phase, as a conductive adjuvant in a weight ratio of 3:1 was completely stirred by a homogenizer and was injected into a mold of desired size to form a negative electrode having a desired electrode-density and thickness by a hot-press.

The positive electrode and the negative electrode made as described above were piled up facing to each other via a porous membrane of polyolefin having the thickness of 20 to 50 μm as a separator to make a secondary battery.

As indicated in Table 1 shown below, the initial capacity and the capacity after 10000 cycles were measured using various electrolytes and the measured data are also shown in the table. The cycle condition is as follows:

Charge: 1 A, 1.2 V, CCCV charge for 10 min.
Discharge: CC discharge at 0.2 A, End voltage=0.8 V.

TABLE 1

| | Components of electrolytic solution | | | Capacity characteristics[2] | |
|---|---|---|---|---|---|
| | Concentration of Sulfuric acid | Additives | Additive concentration[1] | Initial | After cycle tests |
| Example 1 | 20 wt % | NH₄⁺·HSO₄⁻ | 20 wt % | 130% | 90% |
| Example 2 | 20 wt % | K⁺·HSO₄⁻ | 10 wt % | 130% | 89% |
| Comparative example 1 | 20 wt % | P-TSA[3] | 20 wt % | 110% | 81% |
| Comparative example 2 | 40 wt % | none | — | 115% | 61% |
| Comparative example 3 | 20 wt % | none | — | 100% | 82% |

Note: [1]Weight % to sulfuric acid content.
[2]A relative value to the initial capacity of Comparative example 3 as 100%.
[3]Paratoluene sulfonic acid.

Figure 2:
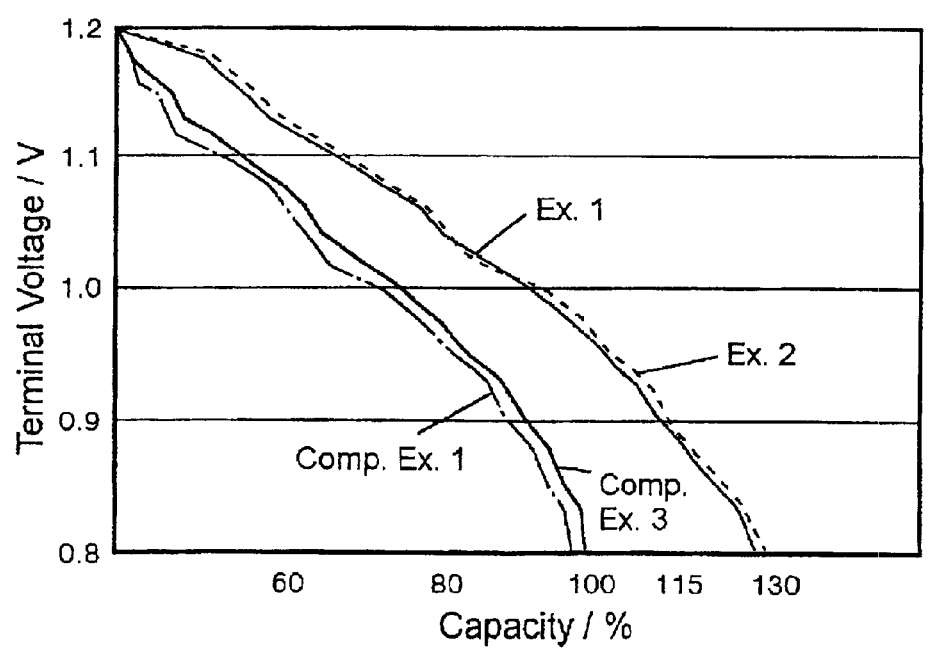
FIG. 2 is a graph showing the capacity changes vs. the terminal voltages.
Figure 3:
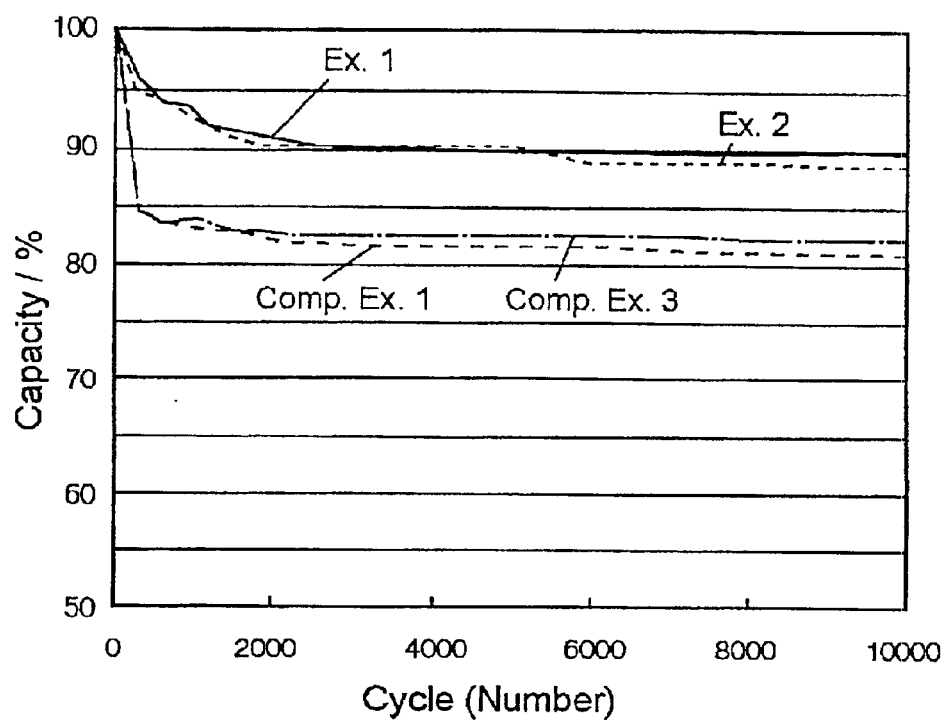
FIG. 3 is a graph showing the progress of the capacity changes during the cycle tests.
Figure 4:
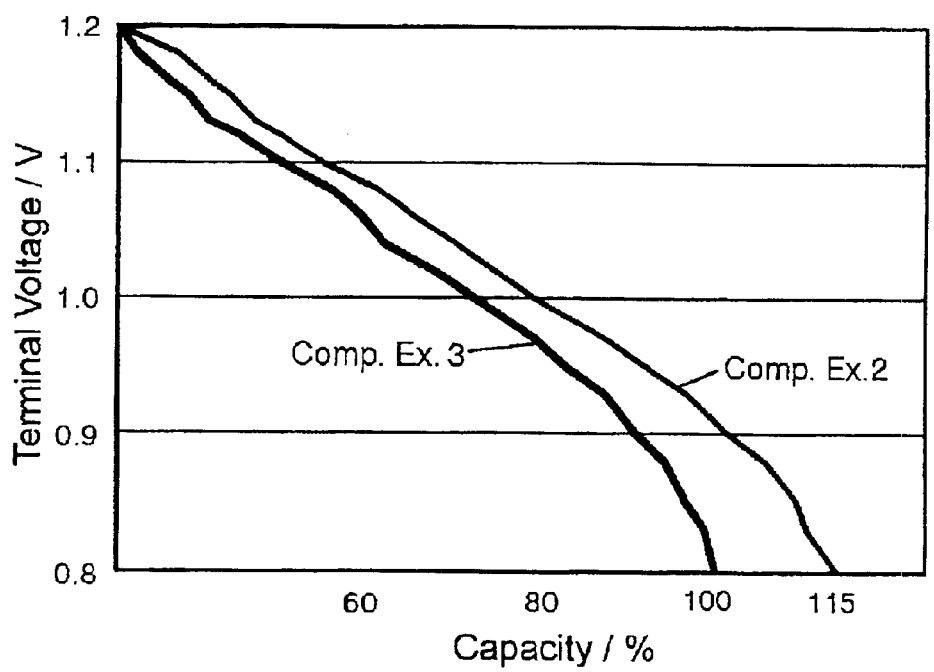
FIG. 4 is a graph showing the capacity changes vs. the terminal voltages when the sulfuric acid concentrations are changed.
Figure 5:
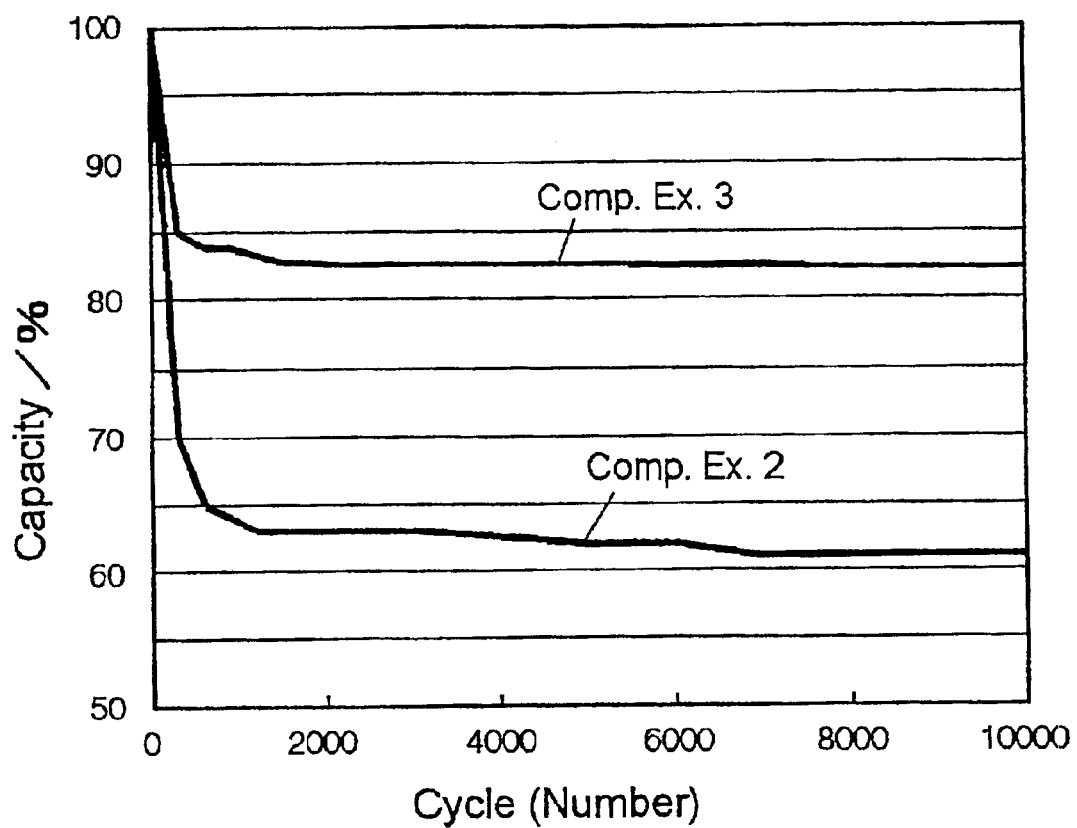
FIG. 5 is a graph showing the progress of the capacity changes in the cycle tests when the sulfuric acid concentration is changed.

FIG. 2 indicates capacity changes vs. terminal voltages and FIG. 3 shows a graph indicating capacity changes up to 10000 cycles.

From these results, it is understood that the example 1 and 2, wherein an additive of hydrogensulfate is added, indicate a high capacity and excellent cycle characteristics. On the other hand, an additive such as paratoluene sulfonic acid which can supply a proton causes a high concentration of an anion with a high proton concentration at the same time and as a result, both capacity and cycle characteristics are worse than in the case of none additives.

What is claimed is:

1. A secondary battery of a proton conductive polymer, wherein a positive electrode and a negative electrode are arranged facing each other via a separator in an electrolyte and only a proton in an indole trimer, a π conjugated polymer, or a proton of a hydroxyl group-containing polymer is an active material of electrode in the positive electrode and in the negative electrode and participates in a charge/discharge, and a proton concentration is 5 to 40 wt % and an anion concentration is 30 to 60 wt % in the electrolyte solution, respectively, and the anion concentration is at least higher than the proton concentration.

2. The secondary battery as claimed in claim 1, wherein the electrolyte is an aqueous solution of sulfuric acid and hydrogensulfate is added in the aqueous solution.

3. The secondary battery as claimed in claim 2, wherein the hydrogensulfate is potassium hydrogensulfate.

4. The secondary battery as claimed in claim 2, wherein the hydrogensulfate is quaternary ammonium hydrogen sulfate.

5. The secondary battery as claimed in claim 1, wherein the concentration of sulfuric acid in the electrolyte is 5 to 40%.

6. The secondary battery as claimed in claim 1, wherein the concentration of the hydrogensulfate added to the electrolyte is such that a weight ratio of the sulfuric acid to the hydrogensulfate is 100 parts of the sulfuric acid to 5 to 45 parts of the hydrogensulfate.

7. The secondary battery as claimed in claim 1, wherein the active material of the positive electrode is selected from a group consisting of polyaniline, polydianiline, polydiaminoanthraquinone, polybiphenylaniline, polynaphthylaniline, indice trimer and their derivatives, and the active material of the negative electrode is selected from a group consisting of polypyridine polypyrimidine, polyquinoxaline and their derivatives.

* * * * *